United States Patent
Xiong et al.

(10) Patent No.: US 9,503,773 B2
(45) Date of Patent: Nov. 22, 2016

(54) SEPARATING INTERNET TV AND BROADCAST TV USING A TV REMOTE CONTROL

(75) Inventors: True Xiong, San Diego, CA (US); Ling Jun Wong, Escondido, CA (US)

(73) Assignee: SONY CORPORATION, Tokyo (JP)

( * ) Notice: Subject to any disclaimer, the term of this patent is extended or adjusted under 35 U.S.C. 154(b) by 912 days.

(21) Appl. No.: 12/787,562

(22) Filed: May 26, 2010

(65) Prior Publication Data

US 2011/0296464 A1    Dec. 1, 2011

(51) Int. Cl.
*H04N 21/422* (2011.01)
*H04N 21/4722* (2011.01)
*H04N 21/4782* (2011.01)

(52) U.S. Cl.
CPC .... *H04N 21/42209* (2013.01); *H04N 21/4722* (2013.01); *H04N 21/4782* (2013.01)

(58) Field of Classification Search
CPC .................................................. H04N 21/4126
USPC ..................................................... 725/51, 81
See application file for complete search history.

(56) References Cited

U.S. PATENT DOCUMENTS

| | | | |
|---|---|---|---|
| 6,061,719 A * | 5/2000 | Bendinelli et al. ........... 709/218 | |
| 6,073,171 A | 6/2000 | Gaughan et al. | |
| 6,097,441 A * | 8/2000 | Allport ........................ 348/552 | |
| 6,349,410 B1 | 2/2002 | Lortz | |
| 6,496,122 B2 * | 12/2002 | Sampsell .............. H03J 1/0025 340/12.28 | |
| 6,882,299 B1 | 4/2005 | Allport | |
| 7,699,229 B2 * | 4/2010 | Bennett et al. .......... 235/472.01 | |
| 8,082,572 B1 * | 12/2011 | Tilford .......................... 725/133 | |
| 2002/0143805 A1 * | 10/2002 | Hayes ................... G06F 1/1626 345/169 | |
| 2002/0162120 A1 * | 10/2002 | Mitchell ...................... 725/135 | |
| 2003/0034957 A1 * | 2/2003 | Dubil et al. .................. 345/158 | |
| 2004/0008287 A1 * | 1/2004 | Johnston ............. H04N 21/4126 348/734 | |
| 2004/0103032 A1 * | 5/2004 | Maggio .......................... 705/14 | |
| 2004/0152414 A1 * | 8/2004 | Wang ................. H04N 5/44582 455/3.04 | |
| 2005/0055640 A1 * | 3/2005 | Alten ................. H04N 21/4348 715/719 | |
| 2005/0108751 A1 * | 5/2005 | Dacosta ................ G06F 3/0482 725/39 | |
| 2006/0041923 A1 * | 2/2006 | McQuaide .................... 725/131 | |
| 2006/0168622 A1 | 7/2006 | Poll et al. | |
| 2006/0271968 A1 * | 11/2006 | Zellner ................ H04N 5/4403 725/81 | |
| 2007/0277197 A1 * | 11/2007 | Dawson .......................... 725/37 | |
| 2007/0291694 A1 * | 12/2007 | Zhang ........................... 370/331 | |
| 2009/0064236 A1 * | 3/2009 | Lee ........................ H04H 20/18 725/62 | |
| 2009/0081950 A1 * | 3/2009 | Matsubara et al. .......... 455/3.06 | |

(Continued)

OTHER PUBLICATIONS

Samsung, "The Samsung UN55C99000 3D TV", http://www.best-edtvs.com/samsung-3d-tv-reviews/samsung-un55c9000-review/.

(Continued)

*Primary Examiner* — Hunter B Lonsberry
*Assistant Examiner* — Alexander Q Huerta
(74) *Attorney, Agent, or Firm* — John L. Rogitz

(57) ABSTRACT

Internet application use and execution in an IPTV system is separated from the television to eliminate the Internet application learning curve and at the same time preserve a viewing experience.

16 Claims, 3 Drawing Sheets

(56) References Cited

U.S. PATENT DOCUMENTS

| | | | |
|---|---|---|---|
| 2009/0150928 A1* | 6/2009 | Hsu | H04N 5/44513 725/34 |
| 2010/0060549 A1* | 3/2010 | Tsern | G06F 3/1415 345/2.1 |
| 2010/0186038 A1* | 7/2010 | Thomas et al. | 725/42 |
| 2010/0205628 A1* | 8/2010 | Davis et al. | 725/25 |
| 2010/0222102 A1* | 9/2010 | Rodriguez | 455/557 |

OTHER PUBLICATIONS

Apple "Remote for iPhone and iPod Touch", http:///www.macworld.com/article/134453/2008/07/remoteapp.html.

* cited by examiner

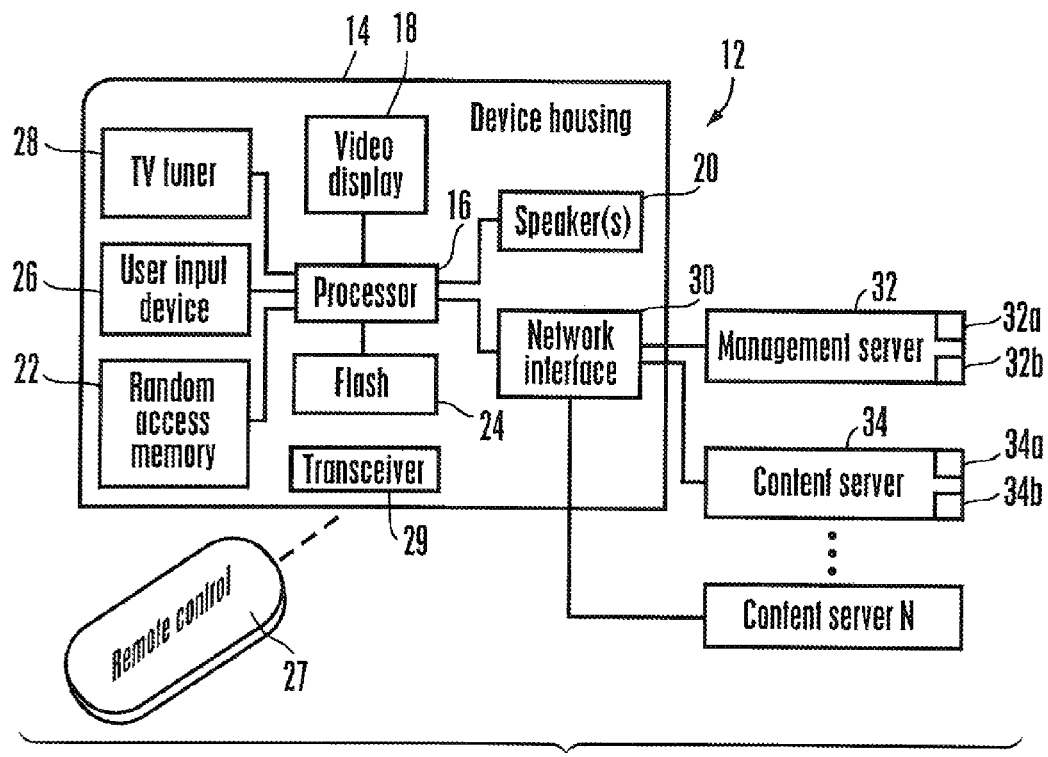
Figure 1
Figure 2
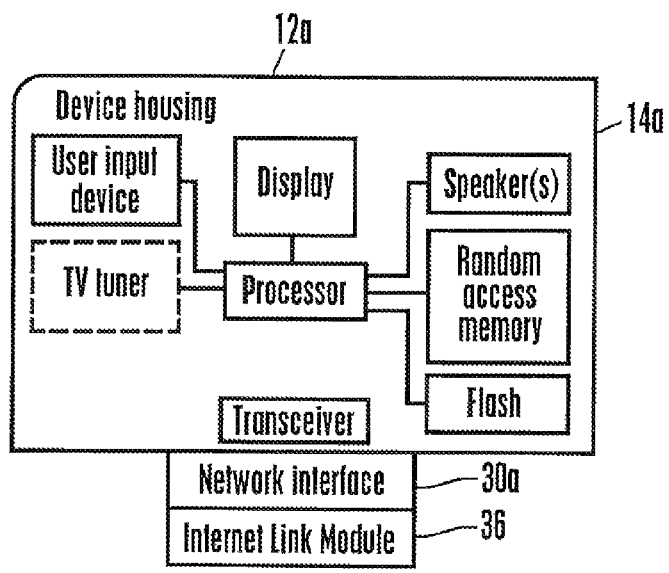

Figure 3
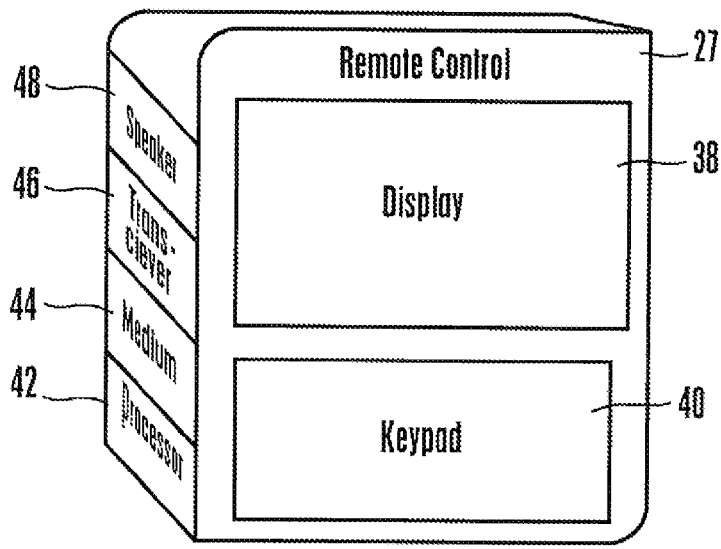
Figure 4 TV user interface
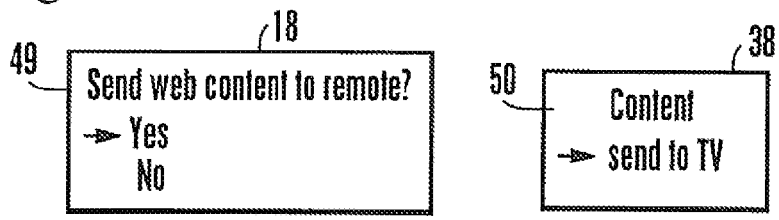
Figure 5 remote control user interface
Figure 6 logic
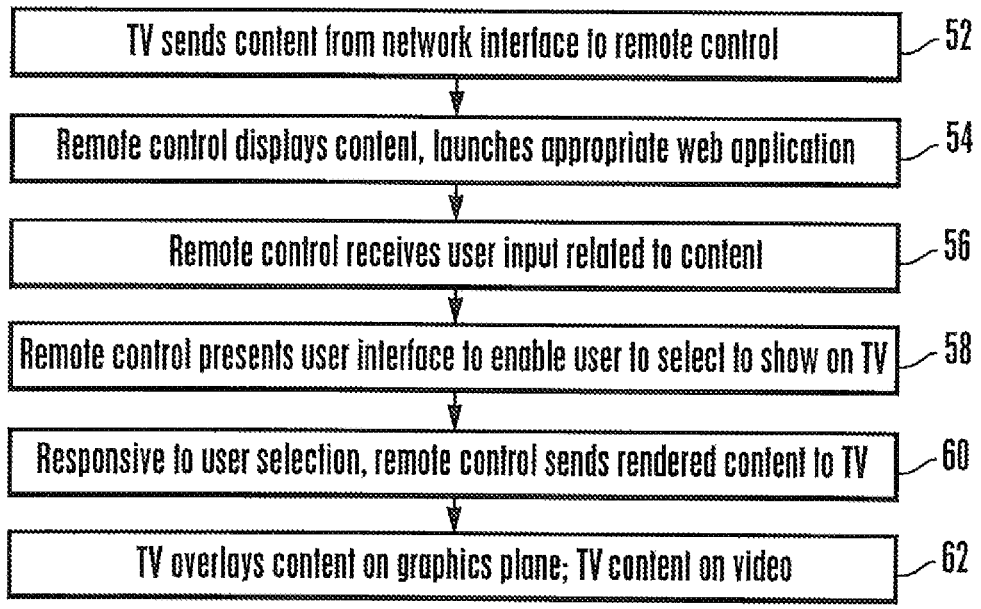

SEPARATING INTERNET TV AND BROADCAST TV USING A TV REMOTE CONTROL

FIELD OF THE INVENTION

The present application relates generally to generating content availability alerts when desired Internet-sourced content becomes available for an Internet-enabled TV.

BACKGROUND OF THE INVENTION

Internet access through TVs is typically provided by essentially programming the TV as though it were a computer executing a browser, Such Internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet.

Nonetheless, as further understood herein, using a TV for internet access, even if limited and controlled, can entail a demand for the TV to execute Internet-based features such as social networking applications, messaging, chat, etc. Present principles recognize that while some users may make such demands, imposing computer-like Internet capability on a TV can create distractions to the overall viewing experience and furthermore require all users to learn social networking applications on the TV, which many users might find objectionable.

SUMMARY OF THE INVENTION

Accordingly, the present application describes providing an option to separate Internet features in an Internet Protocol TV (IPTV) from traditional television viewing and thus eliminate the need to learn how to use Internet applications on the television.

A TV includes a housing, a display on the housing, a network interface, a TV tuner, and a processor in the housing controlling the display and tuner and communicating with the Internet through the network interface. The TV processor sends Internet content through a wireless transceiver to a remote control (RC) for presentation of the Internet content thereon without first presenting the Internet content on the TV display.

In some implementations the processor presents on the TV display a user interface (UI) operable by a user to cause the Internet content to be sent to the RC before display of the content on the TV. The processor may automatically send the Internet content to the RC before display of the content on the TV without user command to do so. In any case, in some embodiments the processor receives back from the RC the Internet content and presents the Internet content on the TV display.

The RC can present the Internet content on a RC display and launch an appropriate Web application for the content. The RC may include a RC processor that receives user input from a RC keypad related to the Internet content, operating on the content in response thereto. In this case the RC can present a UI on the RC display operable to select to send manipulated Internet content back to the TV for presentation. Or, the RC can automatically send the Internet content back to the TV when the Internet content is ready for presentation without user command to do so. Internet content received back from the RC can be presented on a graphics plane associated with the TV display, with TV programming received through the TV tuner being simultaneously presented in a video plane associated with the TV display.

In another aspect, a remote control (RC) for a TV has an RC processor communicating with the TV via a wireless RC transceiver. An RC display is controlled by the RC processor and presents Internet content received from the TV by the RC processor through the RC transceiver. The RC processor receives user input from an RC input device to operate Internet-based applications associated with the Internet content received through the TV from an Internet server, thereby eliminating a learning curve inherent in forcing all users to operate Internet-based applications by means of the TV, The RC processor presents on the RC display a user interface (UI) enabling user to send operated-on Internet content received from the TV back to the TV through the RC transceiver for presentation thereof on the TV.

In another aspect, a method includes providing an option to separate Internet features in an Internet Protocol TV (IPTV) from television viewing, and sending Internet features to an ancillary device associated with the IPTV for presentation of the Internet features on the ancillary device and for operation of applications related to the Internet features using the ancillary device.

The details of the present invention, both as to its structure and operation, can best be understood in reference to the accompanying drawings, in which like reference numerals refer to like parts, and in which:

BRIEF' DESCRIPTION OF THE DRAWINGS

FIG. 1 is a block diagram of an example system in accordance with present principles;

FIG. 2 is a block diagram of another example system in accordance with present principles;

FIG. 3 is a perspective view of an example remote control (RC), schematically showing internal components;

FIG. 4 is a screen shot of an example TV user interface (UT) which can be used to send Internet-sourced content to the RC for display;

FIG. 5 is a screen shot of an example RC user interface (UI) which can be used to send Internet-sourced content to the TV for display; and FIG. 6 is a flow chart of example logic in accordance with present principles.

DETAILED DESCRIPTION OF THE PREFERRED EMBODIMENT

Figure 7:
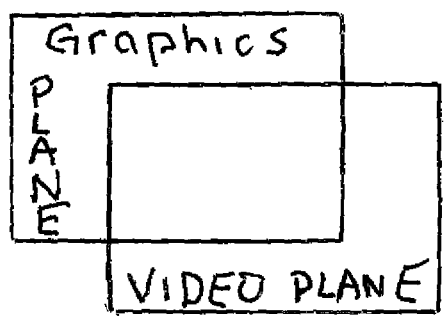
FIG. 7 is a schematic diagram of a video plane and graphics plane.

Referring initially to FIG. 1, a consumer electronics (CE) device 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers.

To undertake present principles, the processor 16 may access one or more computer readable storage media such as but not limited to RAM-based storage 22 (e.g., a chip implementing dynamic random access memory (DRAM)) or flash memory 24. Software code implementing present logic executable by the CE device 12 may be stored on one of the memories shown to undertake present principles.

The processor 16 can receive user input signals from various input devices, including a keypad 26, a remote control (RC) device 27, a point and click device such as a mouse, a keypad, etc, The RC 27 communicate wirelessly with the processor 16 via one or more wireless transceivers 29 (only one transceiver 29 shown for clarity) such as a WiFi transceiver, and or a Bluetooth transceiver, and/or an infrared (IR) transceiver.

A TV tuner 28 may be provided in some implementations particularly when the CE device is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to a management server 32 on the Internet and to one or more content servers 34. The servers 32, 34 have respective processors 32a, 34a and respective computer readable storage media 32b, 34b, It is to be understood in view of disclosure below that the CE device 12 particularly when implemented by a non-PC device such as a TV or game console or camera can communicate only with the management server 32 and with content servers 34 that appear on a service list provided to the processor 16 by the management server 32, with the service list not being modifiable by the processor 16. In any case, the content servers 34 are participants in the IPTV system to gain entry onto the service list.

FIG. 2 shows a CE device 12a that in all essential respects is identical to the device 12 shown in FIG. 1, except that a network interface 30a is not located within the device housing 14a but instead is supported in a separate Internet link module housing 36 that may be mounted on the device housing 14a.

Now referring to FIG. 3, according to present principles Internet-based features/applications may be screened from the TV 12 and instead sent to the RC 27 for control and display. Accordingly, the RC 27 can include a visual display 38 such as a touchscreen display and, if desired, a user input device such as a QWERTY keypad 40 or other keypad. An RC processor 42 accessing a computer readable storage medium 44 receives command signals from the keypad 40 and controls the RC display 38 to present, e.g., Internet content thereon. The RC processor 42 can communicate with the TV processor 16 through one or more wireless transceivers 46 such as IR transceiver, WiFi transceivers, Bluetooth transceiver, etc. The RC 27 may also include one or more audio speakers 48 controlled by the RC processor 42 to present audio Internet content thereon.

As intended by present principles, a user can use the RC 27 to operate all Internet-based applications received through the TV 12 from one of the content servers 34, thereby eliminating the learning curve inherent in forcing all users to operate Internet-based applications through the TV 12. Also, because the RC 27 has a convenient keypad 40 the difficulty with keying in a letter using a conventional numeric button RC is eliminated. With these principles in mind, a UI 49 in FIG. 4 may be invoked for presentation on the TV display 18 allowing a user to select sending Internet content (content received through the network interface 30) to the RC 27 for display. In the example UI 49 shown, the user need simply click "yes", which causes Internet-sourced content to the RC 27 through the transceivers 29, 46.

After manipulation/operation of any applications related to the Internet-sourced content using the RC 27, e.g., after responding to a social networking message (discussed further below with reference to FIG. 6), a UI 50 of FIG. 5 may be presented on the RC display 38. The example UI 50 enables the user to send the operated-on content back to the TV 12 through the transceivers 29, 46 for presentation on the TV display 18. In the example shown, the user need only select "send to TV" or equivalent prompt to undertake this transfer.

FIG. 6 shows example logic that may be employed in accordance with principles above. Commencing at block 52, responsive to user commands (or in some cases automatically), the TV 12 sends Internet-related content directly to the RC 27 for presentation thereof without presenting the Internet content on the TV first. At block 54 the RC 27 presents the Internet content and launches any appropriate Web application for the content, e.g., a Web browser, a social networking widget, etc.

Proceeding to block 56, the RC processor 42 may, if desired by the user, receive any user input from the keypad 40 that is related to the content, operating on the content in response thereto. The RC 27 may then present the UI 50 on the RC display 38 to enable a user to select to send the manipulated Internet content back to the TV 12 for presentation. Responsive to a user selection to so present the content on the TV, at block 60 the RC 27 sends the content back to the TV through the transceivers 29, 42. Or, the RC 27 may automatically send the Internet content back to the TV when the content is ready for presentation (i.e., fully "loaded" from a content server 34). At block 62 the TV 12 receives the content and may overlay it on a graphics plane (FIG. 7), which is presented on the TV display 18, while still presenting TV programming received through the TV tuner 28 in the video plane (FIG. 7) of the TV display 18.

Accordingly, a television viewer does not have to wait for the Internet content (video/audio) to be loaded for full display on the TV. Instead, the user can still watch television in the "video plane" and when the Internet content is ready on the RC 27, it can be sent to the TV 12 for display.

While the particular CONTENT ALERT UPON AVAILABILITY FOR INTERNET-ENABLED TV is herein shown and described in detail, it is to be understood that the subject matter which is encompassed by the present invention is limited only by the claims.

What is claimed is:
1. Assembly comprising
at least one computer readable memory that is not a transitory signal and that comprises instructions executable by at least one processor for;
sending audio video Internet content through a wireless transceiver to a remote control (RC) for presentation of the audio video Internet content on the RC without first presenting the audio video Internet content on a video display controlled by the at least one processor, the audio video Internet content being audio video content in that the audio video content includes at least moving video content;

receiving back from the RC the audio video Internet content once the audio video Internet content has been fully downloaded by the RC over the Internet, and presenting the fully downloaded audio video Internet content received back from the RC in a graphics plane associated with the video display, TV programming received through a TV receiver being presented in a video plane associated with the video display simultaneously with the audio video Internet content received back from the RC in the graphics plane.

2. The assembly of claim 1, wherein the instructions are executable to present on the video display a user interface (UI) operable by a user to cause the Internet content to be sent to the RC before display of the content on the video display.

3. The assembly of claim 2, the processor presents on the UI a selector element at least indicating the phrase "send to remote," the selector element being selectable by the user to cause the Internet content to be Sent to the RC before display of the content on the video display.

4. The assembly of claim 1, wherein the instructions are executable to automatically send the Internet content to the RC before display of the content on the video display without user command to do so.

5. The assembly of claim 1, further comprising the RC in combination with the processor and display.

6. The assembly of claim 5, wherein the RC is configured to present the Internet content on a RC display and launch an appropriate Web application for the content.

7. The assembly of claim 6, wherein the RC includes a RC processor that is configured to receive user input from a RC keypad related to the audio video Internet content, operating on the audio video Internet content in response thereto to alter the audio video Internet content prior to sending the audio video Internet content to the video display for simultaneous presentation of the audio video Internet content with the TV programming on the video display.

8. The assembly of claim 7, wherein the RC is configured to present a UI the RC display operable to select to send manipulated Internet content back to the video display for presentation.

9. The assembly of claim 6, wherein the RC is configured to automatically send the Internet content back to the video display when the Internet content is fully downloaded without user command to do so.

10. Method comprising:

providing an option to separate Internet features in an audio video display device (AVDD) from television programming;

sending Internet features to an ancillary device associated with the AVDD for presentation of the Internet features on the ancillary device and for operation of applications related to the Internet features using the ancillary device;

receiving back from the ancillary device the Internet features including at least one social networking message input by means of the ancillary device once at least some of the Internet features have been fully downloaded by the ancillary device over the Internet; and presenting downloaded Internet features received back from the ancillary device in a first plane associated with an AVDD display, video programming being presenting in a second plane associated with the AVDD display simultaneously with the Internet features received back form the ancillary device in the first plane, the Internet features including at least moving video content.

11. Method of claim 10, comprising:

sending content representative of the Internet features back to the AVDD from the ancillary device after operation of the applications related to the Internet features.

12. Method of claim 11, comprising:

sending Internet content through a wireless transceiver to a remote control (RC) for presentation of the Internet content thereon without first presenting the Internet content on the AVDD display.

13. Method of claim 10, comprising presenting on the AVDD display a user interface (UI) operable by a user to cause the Internet content to be sent to the RC before display of the content on the AVDD.

14. Method of claim 10, wherein the ancillary device is a remote control (RC), and the method further comprises presenting the Internet features on a RC display of the RC and launching a social networking application for the content.

15. Method of claim 14, comprising receiving user input from a RC keypad related to he Internet content, and operating on the content in response thereto.

16. Method of claim 15, comprising presenting a UI on the RC display operable to select to send manipulated Internet content back to the AVDD for presentation.

* * * * *